Oct. 17, 1961 E. E. KORDES ET AL 3,005,081
HIGH INTENSITY HEAT AND LIGHT UNIT
Filed April 4, 1960 2 Sheets-Sheet 1

INVENTORS
ELDON E. KORDES
DONALD H. TRUSSELL
DEENE J. WEIDMAN
GEORGE E. GRIFFITH

BY

ATTORNEYS

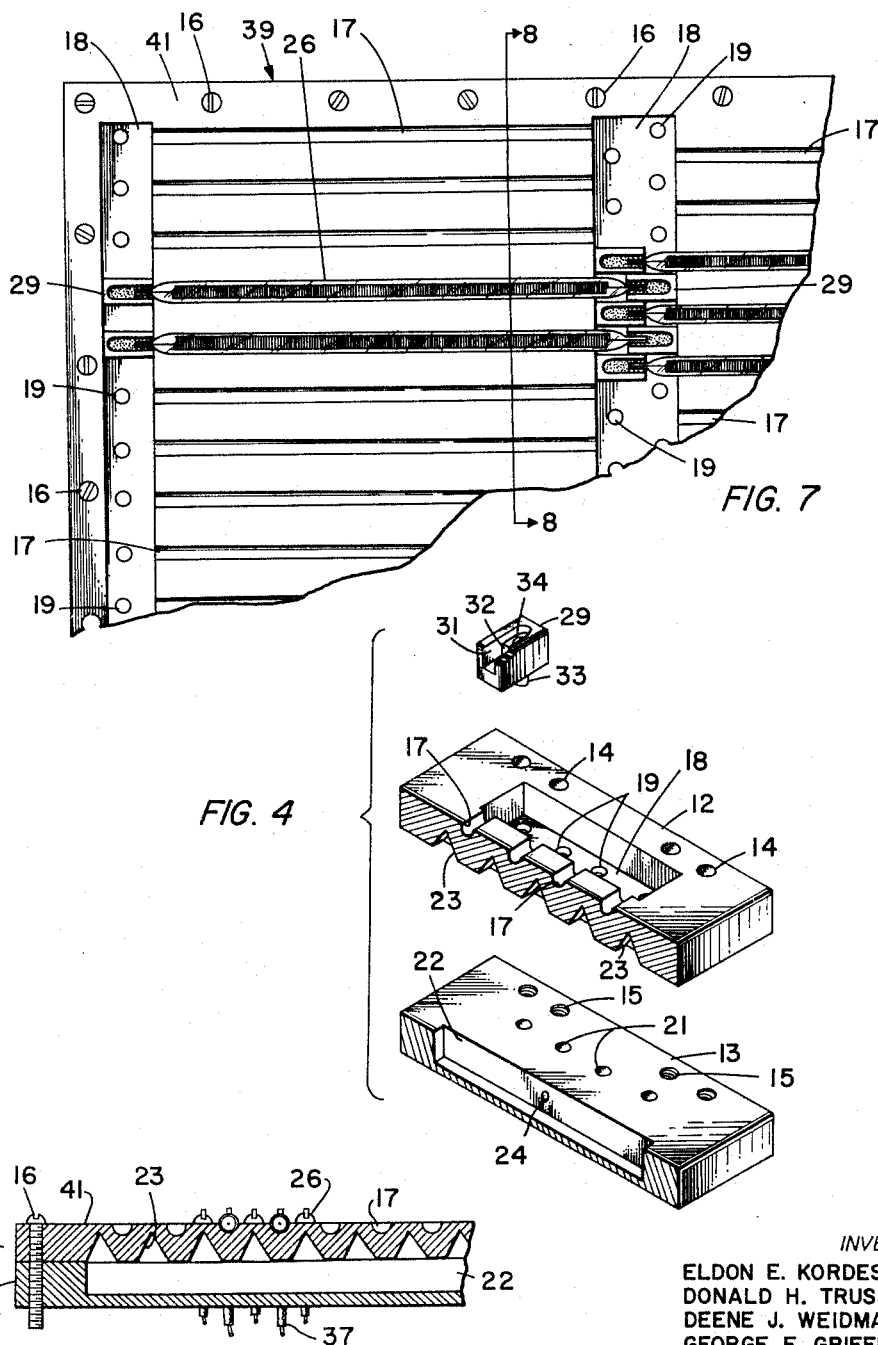

United States Patent Office 3,005,081
Patented Oct. 17, 1961

3,005,081
HIGH INTENSITY HEAT AND LIGHT UNIT
Eldon E. Kordes, Newport News, Donald H. Trussell, Hampton, Deene J. Weidman, Tabbs, and George E. Griffith, Newport News, Va., assignors to the United States of America as represented by the Administrator of the National Aeronautics and Space Administration
Filed Apr. 4, 1960, Ser. No. 19,971
2 Claims. (Cl. 219—34)
(Granted under Title 35, U.S. Code (1952), sec. 266)

The invention described herein may be manufactured and used by or for the Government of the United States of America for governmental purposes without the payment of any royalties thereon or therefor.

This invention relates generally to a high intensity heat and light radiating unit, and more particularly to a unit having lamp elements protectively positioned to withstand severe environmental stresses to which the unit is exposed in use.

The unit of the present invention is deemed particularly useful as a high intensity light and heat source in the study and observation of the behavior of structural materials and components subjected to a predetermined intensity of external heating while also under the influence of such conditions as fatigue, high intensity noise, large pressure changes, high velocity air flow, and the like, and also in the study of various aerodynamic configurations under the influence of these conditions. The design of the heat and light source unit is such that it is capable of withstanding these environmental conditions when mounted, for example, within a high speed wind tunnel or an environmental test chamber. Previous attempts to provide such a heat and light source have proved unsuccessful either because the source elements themselves could not withstand the loads imposed thereupon, or because devices used to protect the source elements limited the size of the heater and restricted the total output of useful heat or light. One such expedient, for example, involved the placing of quartz-tube lamps, with a flat reflecting surface positioned several inches therebehind, near a supersonic airstream. This arrangement did not operate satisfactorily since the lamps were unable to withstand the aerodynamic forces imposed thereon. It has also been proposed that such devices as jet engine or rocket exhausts, and arc jets, be utilized as heating elements for airstreams. These devices also have been found unsatisfactory in that airstream contamination due to incomplete combustion takes place, and difficulty in controlling both the amount of heat and aerodynamic conditions is inherent in these devices. The heat and light unit of the present invention, as will hereinafter be more fully described, is characterized by having quartz-tube lamp elements sunk in grooves formed in the surface of a reflector plate and in intimate contact therewith; the grooves acting as reflector surfaces as well as serving to protect the lamp elements. Means are also provided for removing heat from the reflector plate absorbed from the lamp elements.

Accordingly, it is an object of the instant invention to provide a new and improved high intensity heat and light radiating unit capable of withstanding severe environmental stresses.

Another object of the present invention is the provision of a new and improved high intensity heat and light radiating unit comprising protectively mounted heat and light elements.

A further object of the instant invention is the provision of a new and improved unit for radiating high intensity heat and light and exhibiting prolonged operating life due to improved excess heat removal capabilities.

Other objects and many of the attendant advantages of the invention will be readily appreciated as the same becomes better understood by reference to the following detailed description when considered in connection with the accompanying drawings wherein:

FIGURE 4 is an isometric exploded view of certain of the elements seen in a section taken along the line 4—4 of FIGURE 1;

FIGURE 7 is a fragmentary plan view of a modification of the heat and light radiating unit of FIGURE 1; and, FIGURE 8 is a sectional view of the unit of FIGURE 7 taken along the line 8—8 of FIGURE 7.

Figure 1:
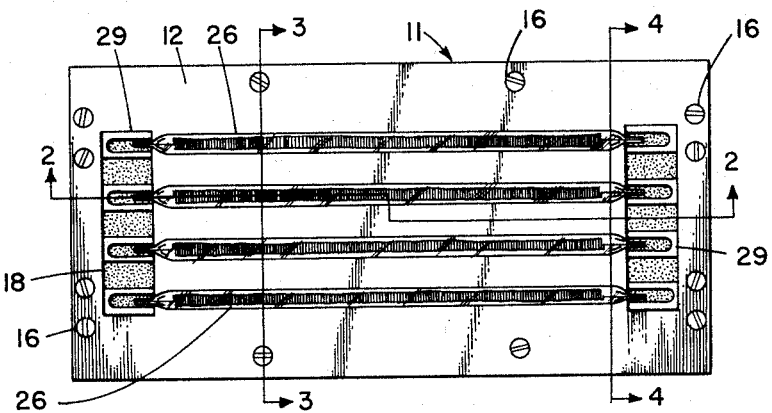
FIGURE 1 is a plan view of an assembled heat and light radiating unit.
Figure 2:
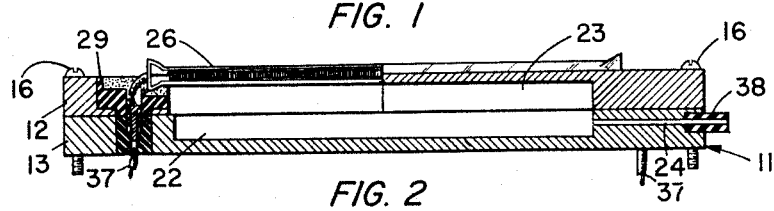
FIGURE 2 is a sectional view of the assembled heat and light radiating unit taken along the line 2—2 of FIGURE 1.
Figure 3:
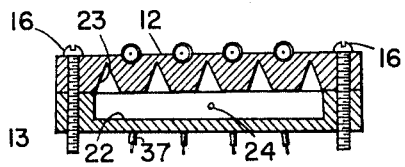
FIGURE 3 is a sectional view of the assembled heat and light radiating unit taken along the line 3—3 of FIGURE 1.

Referring now more particularly to the drawings wherein like reference numerals designate identical parts throughout the several views, and more particularly to FIGURES 1 to 4, there is shown a high intensity heat and light radiating unit, generally designated by the reference numeral 11. Unit 11 comprises a metal reflector plate 12, preferably of aluminum or other metal having a highly reflective surface and which is resistant to corrosion and oxidation, and a metal coolant reservoir element 13, both of rectangular configuration and having a common length and breadth. A plurality of spaced holes 14 are formed through plate 12 adjacent each edge thereof, and a plurality of internally threaded holes 15 are formed through element 13 in alignment with holes 14. A plurality of bolts 16 having shanks threaded to conform with the threads of holes 15 are passed through holes 14 and screwed into holes 15 to connect plate 12 to element 13. The shank of bolt 15 is longer than the combined thickness of plate 12 and element 13, and the threaded end thereof projecting beyond element 13 may be utilized in connecting the unit 11 to a backing structure, not shown. A plurality of straight semi-cylindrical grooves 17 are formed in the outer surface of reflector plate 12, preferably with the center of the curve defining the arcuate surface of each groove spaced below the surface of plate 12 a distance equal to about one-third the radius of the curve, and the sides of each groove for this distance being perpendicular to the outer surface of plate 12. The grooves 17 are disposed in equidistantly spaced mutually parallel relationship and run parallel with the long edges of plate 12. A rectangular recess 18 having straight side walls and a flat bottom is formed in the outer surface of plate 12 adjacent each end thereof; a long side of each recess 18 being positioned in spaced parallel relation with a short edge of plate 12. An end of each of the grooves 17 terminates at the other long side of each of the recesses 18 and connects therewith, as best seen in FIGURE 4. The depth of recesses 18 is somewhat greater than the depth of grooves 17 but less than the thickness of plate 12, and in each recess 18 a plurality of apertures 19 are formed in the bottom thereof for communication with the inner surface of plate 12; each aperture 19 being so positioned that an extension of the centerline thereof will intersect at right angles an extension of the centerline of a groove 17.

The coolant reservoir element 13 is provided with a plurality of apertures 21 aligned with the apertures 19 of plate 12 to provide a plurality of passageways between the bottom of each recess 18 and the outer surface of element 13. The inner surface of element 13 is also provided with a large rectangular coolant reservoir recess 22 having straight side walls and a flat bottom; the depth thereof being slightly less than the thickness of element 13. The end walls of recess 22 are spaced inwardly of the short edges of unit 11 a distance somewhat greater than the side walls of recesses 18 with which the grooves 17 connect, and the side walls of recess 22 are spaced inwardly from the long edges of unit 11 a distance somewhat less than the transverse spacing of screw holes 14 positioned adjacent these edges.

A plurality of spaced, parallel grooves 23 having the shape of isosceles triangles in cross-section and having end walls perpendicular to the length thereof are formed on the inner surface of plate 12. When plate 12 and element 13 are connected together, the end walls of grooves 23 and the end walls of recess 22 are coplanar, and the grooves 23 open upon the recess 22 in effect forming a portion of the coolant reservoir. The number of grooves 23 formed on the inner surface of plate 12 is one more than the number of grooves 17 formed on the outer surface thereof. The spacing of grooves 23 is equal to the spacing of grooves 17, and the grooves 17 are symmetrically offset with respect to the grooves 23 in the transverse direction of plate 12. The two outermost grooves 23 have base outer edges spaced the same distance from the long edges of unit 11 as the side walls of recess 22. The apices of grooves 23 are positioned in plate 12 a distance from the outer surface thereof less than the depth of grooves 17, which are symmetrically situated therebetween, leaving only relatively thin walls between grooves 17 and grooves 23.

A fluid coolant passageway or port 24 is formed in each end of element 13 between the end walls of recess 22 and the short edges of element 13 adjacent thereto. Each port 24 comprises a tubular aperture of fixed diameter for the greater part of its length, with a portion 25 adjacent the edge of element 13 of an increased constant diameter. When plate 12 and element 13 are assembled to form unit 11, a gasket member, not shown, is preferably interposed between the abutting inner surfaces thereof to prevent coolant leakage from the reservoir comprising recess 22 and grooves 23.

A cylindrical quartz-tube lamp 26 having flattened ends is provided for each of the grooves 17 formed in the outer surface of plate 12. Each lamp 26 contains a filament 27 extending from end to end therein, and is provided with external leads 28 connected to filament 27 at each end thereof. A special end connector 29 formed of a high-temperature resistant, resilient, insulating material such as, for example, Dow Corning Co. No. 301 molding compound, is provided for each end of each of the lamps 26. Connector 29 is essentially of a rectangular block-like configuration; the length thereof being substantially equal to the width of recess 18, the width thereof being somewhat less than the center line spacing between grooves 17, and the depth thereof being substantially equal to the depth of recess 18. A longitudinal recess 31 is formed in the upper surface of each connector 29 commencing at a point spaced from one end surface thereof a distance on the order of about one-eighth the length of the connector, and extending through the outer end surface of the connector, thereby leaving a substantially U-shaped wall enclosing three sides of recess 31. The width of recess 31 is substantially equal to the width of grooves 17, and the depth thereof at its open end is preferably about one and one-half times the depth of grooves 17. This depth of groove 31 is constant for about one-half the length thereof, abruptly terminating at a step 32, from which the depth of groove 31 to the end wall thereof is about half the depth hereinbefore described. A cylindrical projection 33 is formed on the lower surface of connector 29 at a point between the ends thereof corresponding to the location of apertures 19 between the side walls of recesses 18; the diameter of projection 33 being slightly less than the diameters of apertures 19, and the length of projection 33 being substantially equal to the length of apertures 19. A bore 34 is formed between the reduced depth portion of recess 31 and the lower surface of projection 33; bore 34 being smaller in diameter than projection 33 and positioned concentrically with respect thereto. An electrical jack element provided with a conductor prong 35 is positioned in bore 34 near the lower end thereof; the prong 35 projecting downwardly from the lower surface of projection 33. The flattened ends of each lamp element 26 are each positioned in the recess 31 of a connector 29, and the lead 28 coming from each end of a lamp 26 is passed downwardly through the bore 34 of the adjacent connector 29 and connected to a prong 35.

The diameter of each lamp 26 is substantially equal to the diameter of the semi-cylindrical portion of each groove 17, and the cylindrical portion of the length of each lamp 26 is substantially equal to the length of grooves 17. The length of the flattened ends of the lamps 26 is somewhat less than the length of the deeper portion of the recess 31 of the connectors 29. It will now be apparent that each lamp 26 may be seated in a groove 17 with a semi-cylindrical portion of the lamp 26 in contact with the semi-cylindrical portion of the groove, and somewhat more than half of the lamp tube below the surface of reflector plate 12. The connector 29 positioned adjacent each end of each lamp 26 is seated in the recesses 18 adjacent the corresponding end of the groove 17, with the ends of the connector adjacent the side walls of recess 18, and the projection 33 positioned in an aperture 19 with the lower surface of projection 33 substantially flush with the inner surface of reflector plate 12. The flattened end of each lamp 26 is then potted into the recess 31 of the connector 29 associated therewith a high-temperature resistant, resilient potting compound such, for example, as a silicon-molding compound, and each connector 29 is potted into recesses 18 with this compound. It will now be apaprent that the installation of lamps 26 in reflector plate 12 is such that the grooves 17 support each lamp 26 along its entire length so that the lamps may effectively resist the effects of high velocity airflow thereover, and large pressures thereupon. The surfaces of each groove 17 are preferably polished, and act as reflector surface for the lamp filaments 17; the efficiency of the curved reflector surfaces being greater than the efficiency obtained by placing such lamps in spaced relation before a flat reflective surface. Additionally, the large contact area between lamps and grooves effectively promotes heat transfer from lamp to groove, resulting in lower lamp operating temperatures, leading to prolonged lamp life and fewer lamp failures. The protection afforded the lamp elements, the reduced operating temperatures thereof, and the increased reflectivity obtained by placing such lamp elements in at least semi-cylindrical contact with the lamp grooves is considered to be a salient feature of the present invention.

An electrical plug is placed in each of the apertures 21 of coolant reservoir element 13 adjacent the inner surface of element 13; each plug having an insulator element contacting the wall of the aperture 21 and a metal sleeve element 36 concentrically positioned in the insulator element and adapted to snugly receive a jack prong 35 in electrically contacting relation when plate 12 and reservoir element 13 are assembled as hereinbefore described. A lead 37 is connected to each sleeve element and is interconnected to a suitable source of electrical energy, not shown, in such a manner that a current may be made to flow through each lamp 26 when the jack prongs 35 connected to the leads 28 at each end thereof are in contact with a metal sleeve element 36. This electrical connection of the lamps 26 will obviously permit replacement of a lamp 26 without the necessity of disassembling the unit 11; it being merely necessary to remove the connectors associated therewith from recesses 18 and the lamp from groove 17, and a new lamp and connectors installed in lieu thereof.

When lamps 26 of unit 11 are burning, considerable heat may be absorbed by reflector plate 12 by conduction through the walls of grooves 17. To remove this heat from plate 12, a flow of fluid coolant, such as water, is introduced into the reservoir comprising recess 22 and grooves 23 through a coolant conduit 24 at one end of element 13, circulated through the reservoir, and discharged therefrom through the conduit 24 at the other end of element 13. The grooves 23 bring the coolant flow into close proximity with the sources of heat positioned in grooves 17 and also increase the surface area of plate 12 in contact with the coolant, thereby effecting faster conductive cooling of plate 12. Further, fairly effective temperature control of plate 12 may be obtained by varying the rate of coolant flow through the reservoir of unit 11.

Figure 6:
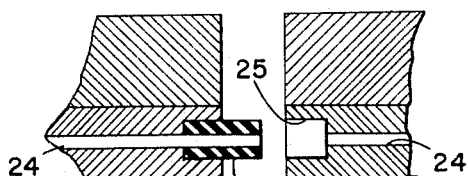
FIGURE 6 is a detail of a fluid coolant conduit connection useable in positioning two or more of the units of FIGURE 1 in abutting end to end relation.
Figure 5:
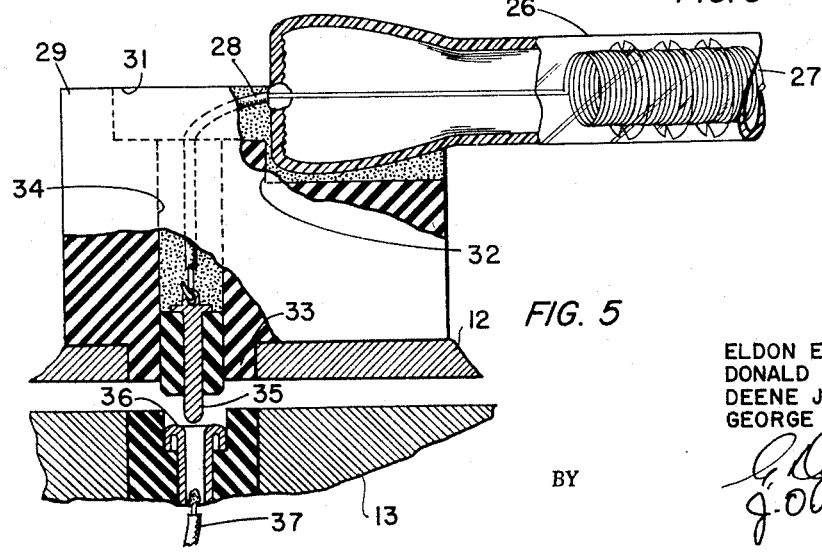
FIGURE 5 is a side elevational view, partially in section, of a lamp unit and an end connector member therefor.

It may occasionally be found desirable to position two or more of the units 11 in end-to-end relation. A resilient tubular connector member 38, composed of a resilient material such as, for example, Neoprene, may then be placed in the enlarged end portion 25 of the conduit 24 at the end of one unit 11, as shown in FIGURE 6. The outer diameter of element 38 is slightly larger than the diameter of conduit portion 25, to obtain a leak resistant press fit. The length of connector 38 is approximately twice the length of a conduit portion 25, so that about half the length thereof projects from the end of the unit 11. A second unit 11 is placed adjacent the first unit, the free end of connector 38 is introduced into the enlarged conduit portion 25 at the end of the second unit, and the two units 11 are brought into substantially abutting relation. Connector 38 thus being press fitted into the enlarged end portions 25 of aligned conduits 24 of adjacent units 11, a leak resistant joint between the reservoirs of the two units 11 is obtained, allowing coolant to pass from one unit to the next for reuse therein. The description of the leak resistant joint hereinbefore set forth is intended for the purpose of illustration rather than limitation, since many equivalent joints capable of obtaining the expressed result are obviously well within the purview of the skilled worker in the conduit joint field.

A modified embodiment of the high intensity light and heat radiating unit of the present invention is fragmentarily shown in FIGURES 7 and 8. This unit, generally designated by the reference numeral 39, comprises a metal reflector plate 41 and a metal coolant reservoir element 42, both of rectangular configuration, and having a common length and breadth, similarly to the assembly of unit 11. Unit 39 is considerably greater in area than unit 11, and a great many more lamps may be provided therefor; the lamps being arranged in several rows. It has been found that this type of unit may hold as many as 96 lamps, there being three rows of lamps each containing 32 lamps arranged in spaced parallel relation. A recess 18 is formed in the outer surface of plate 41 adjacent each end thereof, only one of such recesses 18 being shown, similar to the recesses 18 of the unit 11. One or more additional recesses 18, only one of such additional recesses 18 being shown, are formed in plate 41 between the end recesses 18; the intermediate recesses 18 preferably being somewhat wider than the end recesses 18 but otherwise similar. A plurality of spaced, parallel grooves 17 are formed in the outer surface of plate 41 between adjacent recesses 18, each groove 17 begin equal in cross section to the grooves 17 formed in plate 12 but somewhat lesser in length. The grooves 17 of each row of grooves is offset from the grooves 17 of the adjacent row. An aperture 19 is formed in the bottom of each recess 18 at each end of a groove 17; the apertures 19 in each end recess 18 corresponding with the apertures 19 formed in the recesses 18 of plate 12, and the apertures in the intermediate recesses 18 being somewhat further removed from the end of the adjacent groove 17. A lamp 26 is placed in each groove 17, and end connectors 29 for each end of each lamp 26 are placed in the recesses 18 adjacent each end of each groove 17. The lamps 26 are then potted into the connectors 29, and the connectors 29 are potted into the recesses 18 as in the unit 11. Due to the shorter length of the lamp grooves 17 in plate 41, it will be noted that the cylindrical portions of the lamps 26 extend somewhat into the intermediate recesses 18, thereby obtaining somewhat greater uniformity of light and heat over the space of the plate surface containing the intermediate recesses.

The coolant reservoir element 42 is assembled with reflector plate 41 by means of bolts 16, similar to the assembly of unit 11. A coolant recess or reservoir is formed beneath each row or bank of lamps in unit 39 similar to the single recess 22 of unit 11; each reservoir of unit 39 also consisting of a recess 22 formed in the inner surface of element 42 and a plurality of spaced parallel grooves 23 in the inner surface of reflector plate 41. Each reservoir is positioned between adjacent recesses 18 of unit 39 similarly to the positioning of the coolant reservoir of unit 11. Due to the fact that the individual coolant reservoirs of unit 39 are generally much larger and absorb heat from a much larger reflector plate area than the single reservoir of unit 11, it has been found undesirable to circulate the same coolant fluid through more than a single reservoir. Accordingly, individual coolant conduits, not shown, are provided for each reservoir. At least one conduit for coolant injection and at least one conduit for coolant discharge are provided for each reservoir; preferably between the reservoir and the outer surface of element 42.

Electrical connections between the lamps 26 of the unit 39 and a suitable source of electrical energy, not shown, are made in like manner as the connections of the lamps 26 of unit 11 to a similar energy source.

While the outer surfaces of the reflector plates 12 and 41 are generally flat, as shown in the drawings, it is also within the scope of the invention to provide these plates with an outer surface curved to any desired shape, so long as a developable surface over the length of the lamps is maintained. The shape of the coolant reservoir elements connected to these plates, in such case, may then be curved in conformity therewith. Further, the arcuate portion of the lamp grooves could be made other than semi-cylindrical, if desired; for example, a parabolic curve may be utilized to obtain increased reflectivity and a lamp having a similar cross-sectional shape would then be preferable for installation therein.

It is also contemplated that the reflector plates may be cast in a mold with the lamps and their end connectors in substantially the position hereinbefore described. A suitable material for making such plates, by way of example, is sintered quartz, which is readily moldable using well-known techniques of powder metallurgy. This type of plate, with the lamps made integrally therewith, may be prefereable to the reflector plates hereinbefore described for use under extremely severe environmental conditions, due to the increased support afforded the lamps. In this case, a large radiating unit of the scope such as that shown in FIGURES 7 and 8 would preferably be constructed of a plurality of smaller units such as that shown in FIGURES 1 to 6, in order to facilitate lamp replacement.

In the event it is not found desirable to liquid cool a reflector plate of the types described, the coolant reservoir element normally associated therewith may be eliminated. In such a case, the reflector plate is preferably composed of a material having low thermal conductivity, high heat capacity, and low high-temperature strength deterioration.

Obviously, many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A high intensity heat and light radiating unit comprising a reflector plate having spaced outer and inner surfaces, a first plurality of straight grooves each having at least a semi-cylindrical curved surface formed in said outer surface of said plate, said grooves being disposed in equidistantly spaced parallel relation, a tubular lamp positioned in each of said grooves in semi-cylindrical contacting relation therewith, a coolant reservoir element having an inner surface conforming with the inner surface of said reflector plate connected to said reflector plate with said conforming surfaces disposed in abutting relation, said reservoir element being provided with a reservoir recess formed in said inner surface thereof opening upon said inner surface of said reflector plate, a second pluality of grooves formed in said inner surface of said reflector plate, said grooves of said second plurality opening upon said reservoir recess formed in said reservoir element inner surface, said second pluality of grooves being offset with respect to said first plurality of grooves with the semi-cylindrical portion of each groove of said first plurality of grooves being substantially symmetrically disposed between the deepest portion of two of said second plurality of grooves, at least two fluid flow conduits disposed between said reservoir recess and at least one outer surface of said reservoir element, an exterior recess formed in said outer surface of said reflector plate adjacent each end of said first plurality of grooves, an aperture formed through said reflector plate adjacent each end of each of said semi-cylindrical grooves and disposed in one of said exterior recesses, means adjacent each end of each of said lamps for electrically connecting each lamp end through the adjacent aperture through said reflector plate to a source of electrical energy including a connector element disposed in one of said exterior recesses in said outer reflector plate surface adjacent each end of each of said semi-cylindrical grooves, an elongated conductor element positioned in each connector element and extensible through a reflector plate aperture beyond said inner surface thereof and substantially perpendicularly thereto, an electrical lead connected between each end of each lamp and one of said elongated conductor elements, conductor means carried by said reservoir element adjacent each of said apertures through said reflector plate electrically contactable by said elongated conductor elements when said reservoir element is connected to said reflector plate with said conforming surfaces in abutting relation, and electrical leads connected between said reservoir element carried conductor means and said source of electrical energy.

2. A high intensity heat and light radiating unit comprising a metal reflector plate having a pair of opposed flat surfaces, a first plurality of straight grooves each having at least a semi-cylindrical curved surface formed in a first flat surface of said plate, said grooves being disposed in equidistantly spaced parallel relation, a tubular lamp having a longitudinal filament positioned in each of said grooves in semi-cylindrical contacting relation therewith, a metal coolant reservoir element having a flat surface conforming with the other flat surface of said reflector plate connected to said reflector plate with said conforming surfaces disposed in abutting relation, said reservoir element being provided with a reservoir recess formed in said flat surface thereof opening upon said other flat surface of said reflector plate, a second plurality of grooves formed in said other surface of said reflector plate, said grooves of said second plurality being triangular in cross-section and opening upon said reservoir recess formed in said reservoir element flat surface, said second plurality of grooves being offset with respect to said first plurality of grooves with the semi-cylindrical portion of each groove of said first plurality of grooves being substantially symmetrically disposed between the apices of two triangular grooves of said second plurality of grooves, at least two fluid flow conduits disposed between said reservoir recess and at least one outer surface of said reservoir element, an exterior recess fomed in said first flat surface of said reflector plate adjacent each end of said first plurality of grooves, an aperture formed through said reflector plate adjacent each end of each of said semi-cylindical grooves and disposed in one of said exterior recesses, an aperture formed through said reservoir element in alignment with each of said apertures formed through said reflector plate, and means adjacent each end of each of said lamps for electrically connecting each lamp end through the adjacent pair of aligned apertures to a source of electrical energy including a connector element disposed in one of said recesses in said first flat reflector plate surface adjacent each end of each of said semi-cylindrical grooves, a cylindrical male conductor element positioned in each connector element and extending through a reflector plate aperture beyond the surface of said other flat surface thereof and substantially perpendicularly thereto, an electrical lead connected between each end of each lamp filament and one of said male conductor elements, a female conductor element positioned in said reservoir element adjacent each of said apertures thereof mateable with a male conductor element when said reservoir element is connected to said reflector plate with said conforming surfaces in abutting relation, and electrical leads connected between each of said female conductor elements and said source of electrical energy.

References Cited in the file of this patent

UNITED STATES PATENTS

| 1,231,196 | Rankin et al. | June 26, 1917 |

FOREIGN PATENTS

| 484,199 | Great Britain | Apr. 28, 1938 |
| 723,479 | Germany | Aug. 5, 1942 |
| 415,725 | Italy | Oct. 28, 1946 |
| 278,012 | Switzerland | Jan. 3, 1952 |